United States Patent [19]

Brown et al.

[11] 4,154,178
[45] May 15, 1979

[54] HIGH DENSITY PROGRAMMING MEANS FOR PROGRAMMABLE SEWING MACHINE

[75] Inventors: Jack Brown, Union; John A. Herr, Garwood; Nicholas A. Tarquinio, Elizabeth, all of N.J.

[73] Assignee: The Singer Company, New York, N.Y.

[21] Appl. No.: 879,338

[22] Filed: Feb. 21, 1978

[51] Int. Cl.² .............................................. D05B 3/02
[52] U.S. Cl. ................................ 112/158 E; 200/5 A
[58] Field of Search .......... 112/158 E, 121.11, 121.12; 200/5 A, 5 R

[56] References Cited

U.S. PATENT DOCUMENTS

| | | | |
|---|---|---|---|
| 3,886,335 | 5/1975 | Hendricks | 200/5 A |
| 4,005,293 | 1/1977 | Boulanger | 200/5 A |
| 4,066,850 | 1/1978 | Heys, Jr. | 200/5 A |
| 4,085,691 | 4/1978 | Coughenour et al. | 112/158 E |

OTHER PUBLICATIONS

Promis et al, "Control Panel", 7-2-76, IBM Technical Disclosure Bulletin, pp. 405, 406.

*Primary Examiner*—Peter Nerbun
*Attorney, Agent, or Firm*—Edward P. Schmidt; Robert E. Smith; Edward L. Bell

[57] ABSTRACT

An operator manipulating means for a programable electronically controlled sewing machine. The operator manipulating means provides an array of switch points, each related in a row, to discrete needle positions attainable by the electronically controlled sewing machine; and in a column, to the least feed increment attainable thereby. The switch array is fabricated using a pair of printed circuits, one of which must be flexible and each having spaced, parallel conductors, and arranged with respect to each other so that the conductors of one are substantially perpendicular to the conductors of the other and are in facing relationship. The printed circuits are separated in a first embodiment by a pair of insulating sheets, each having an array of apertures in spaced registry with each other and aligned in rows and columns with the conductors on the printed circuits. The pair of insulating sheets are separated by a flexible conducting sheets which may be used as a common conductor. Depression of a conductor on the flexible printed circuit through an aperture of an insulating sheet will establish a connection to the flexible conducting sheet, which conducting sheet will be deflected through the aperture in spaced registry to establish a connection with a conductor of the other printed circuit.

3 Claims, 7 Drawing Figures

Fig. 7 they high density programming means for programmable sewing machine

BACKGROUND OF THE INVENTION

The invention relates to programmable sewing machines, more particularly, with a high density programming means for use for the programmable sewing machine.

Recently, there have been developed, family sewing machines having the capability to accept in a static read-write memory pattern information selected by or designed by a sewing machine operator. These recently developed programmable family sewing machines provided the sewing machine operator with the capability of producing a variety of switch patterns far beyond that provided by any heretofore known family sewing machine. An early form of such a reprogrammable sewing machine is disclosed in the U.S. Pat. No. 4,014,275 of Herr et al. Still other forms of programmable sewing machines are shown in U.S. Patents Applications Ser. Nos. 709,049 and 709,050, both filed on July 27, 1976.

In the U.S. Patent Application Ser. No. 709,049, now U.S. Pat. No. 4,085,691 there are disclosed two embodiments of a family sewing machine, one having a separable programmable memory unit and the other, an integral programmable memory unit. Access to the programmable memory unit is implemented by a plurality of selector push buttons, preferably aligned in an array of rows and columns so that an operator may visualize thereon the resultant pattern. In the application each push button generates a discrete voltage which may be encoded by an encoder into binary digits suitable for insertion into the read-write memory and subsequent retrieval therefrom and conversion to an analog form to actuate electromechanical actuators such as linear motors. In order to accomplish this each selector button may be connected to a discrete switch which creates a bulky arrangement evident in the 5×5 matrix of the programmable unit disclosed in the application. However, a commercially viable programmable device requires a finer resolution and lower cost arrangement than is attainable with a multiplicity of discrete switch components. Ideally, a device is required which is compact though matched in resolution capability with the resolution capabilities of an electronically controlled sewing machine to which it is attached.

SUMMARY OF THE INVENTION

The invention comprises a high density programming means for a programmable electronic sewing machine capable, in compact form, of providing a switch point for each stitch point attainable in an electronically controlled sewing machine. Two embodiments are disclosed, each of which uses a pair of printed circuit components separated by a flexible insulating sheet having a multiplicity of apertures arranged in rows and columns. In both embodiments, the printed circuits are each formed with conductors spaced from and parallel to each other, the printed circuits being arranged so that the conductors of one are substantially perpendicular to the conductors of the other. In the first embodiment, the printed circuits are separated by two flexible insulating sheets, each having a matrix of apertures in spaced registry, and themselves separated by a flexible thin conductive sheet of, for example, beryllium copper. The apertures of the flexible insulating sheet, which form rows and columns, are aligned with the rows formed by the conductors of one of the printed circuits and with the columns of conductors formed by the other of the printed circuits. Thus a sandwich is formed with the two printed circuits outer most having inward facing conductors in rows or columns aligned with apertures in rows and columns on two contiguous flexible insulating sheets, which are themselves separated by a thin flexible sheet of conductive material. The upper most printed circuit may have on the side opposite the conductors, markings such as X's or circles aligned with the apertures in the flexible insulating sheet, pressure upon which will create a connection between the conductors and the thin flexible conducting sheet of beryllium copper. By a suitable circuitry arrangement such as one involving the application of a potential to the conductors of the printed circuits through resistive elements, and the grounding of the flexible central conducting element, the particular row and column conductors of the printed circuits which are joined may be determined by the potential drop across the resistive elements.

In the second embodiment, one of the printed circuits is formed with a second set of conductors immediately adjacent the first set of conductors, which second set are connected together to form a common conductor taking the place of the flexible conducting sheet of beryllium copper used in the first embodiment. In this second embodiment the conductors of each of the printed circuits are arranged substantially perpendicular one to the other, as in the first embodiment. These printed circuits are separated by one flexible insulating sheet having apertures in registry with the intersection of the conductors. In this embodiment depression of the marked areas on the outer face of the upper most printed circuit will occasion a connection between three conductors, two on one of the printed circuits and the one on the other. With a circuitry arrangement as described for the previous embodiment, the specific conductor intersection depressed can be determined. In this embodiment only a three layer sandwich is required.

Each point of intersection of the conductors of the printed circuits represents, in one direction, such as a row, a point of needle penetration of a work material. The points of intersection of the conductors of the printed circuits in a row represent all the discrete needle positions of which the electronically controlled sewing machine is capable. Adjacent points of intersection of the conductors of the printed circuits in a column represent the smallest advance or reverse motion which the electronically controlled sewing machine is capable of making. Thus, by this arrangement, a sewing machine operator may enter specific instructions as to desired needle position and feed advance or reverse for each successive stitch, which information may be suitably encoded into binary form and entered into a static read-write memory.

DESCRIPTION OF THE DRAWINGS

In the accompanying drawings of preferred embodiments of the invention.

Figure 1:
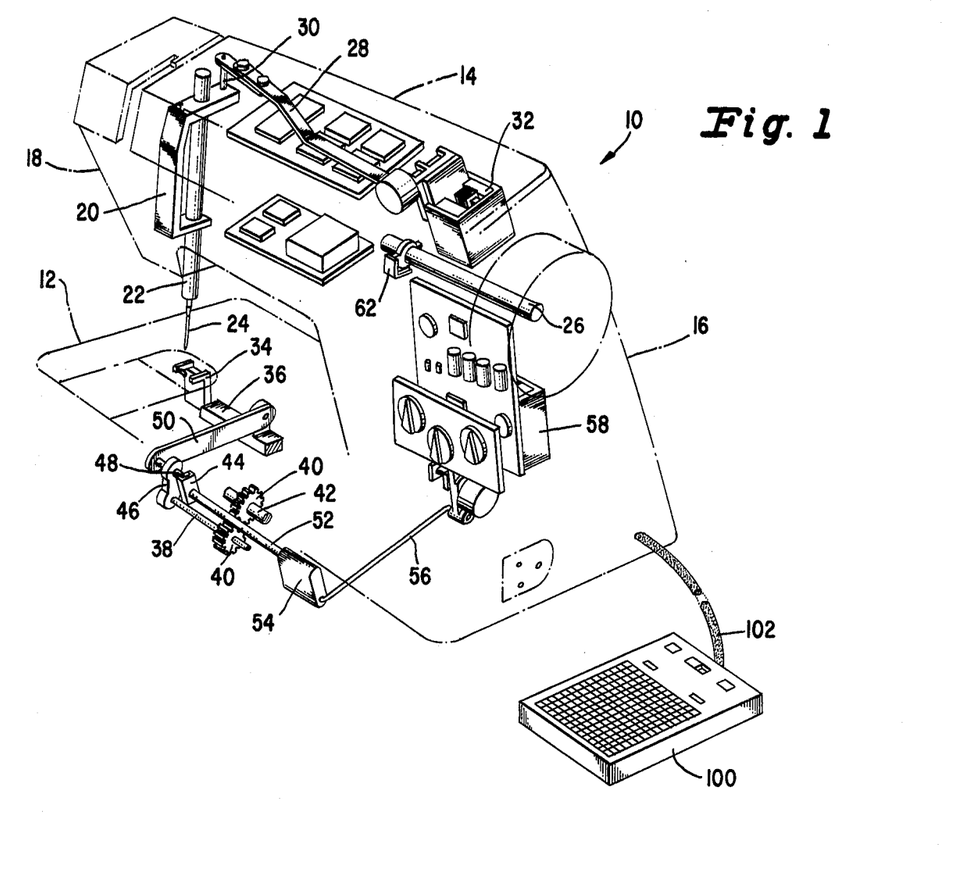
FIG. 1 is a perspective view of a sewing machine of the type used in combination with the present invention, with the frame thereof shown in phantom and components thereof shown in elevation.

Referring to the drawings, in FIG. 1 there is shown a sewing machine casing 10 illustrated in phantom lines, which sewing machine includes a bed 12, a bracket arm 14, and a standard 16 interconnecting the bracket arm with the bed as illustrated. The bracket arm 14 terminates in a head portion 18 within which is supported in a conventional manner a needle bar gate 20, in which is supported for endwise reciprocation, a needle bar 22 carrying at its lower end a needle 24. Endwise reciprocation is imparted to the needle bar 22 by an arm shaft 26 which is rotated by an electric motor (not shown) and connected to the needle bar by a conventional sewing machine mechanism (not shown) such that the rotary motion of the arm shaft 26 is converted to reciprocating motion of the needle bar 22.

An actuating arm 28 is connected to the needle bar gate 20 at pivotal connection 30 to convert reciprocating motion of the actuating arm 28, imparted by a linear motor or actuator 32, into pivotal motion of the needle bar gate 20. The linear motor 32 is of the reversible type and may be of the same type as fully described in the U.S. Pat. No. 3,984,745, issued on Oct. 5, 1976, and assigned to the same assignee as the present invention. It will be seen therefore that the linear motor 32 may be used to determine the lateral position of the needle 24 as it penetrates the fabric disposed on the bed 12 to place a thread therethrough at a particular stitch position coordinate.

In order to feed the fabric across the bed 12 in the usual manner, a feed dog 34 is disposed beneath the bed and is supported by a feed bar 36. Work transporting motion is imparted to the feed dog 34 by means of a feed drive shaft 38 driven by gears 40 which in turn are driven by a bed shaft 42 connected to the sewing machine arm shaft 26 in a timed relationship by a conventional mechanism (not shown). The feed drive shaft 38 carries an eccentric which is encircled by a pitman 46 the other end of which is connected to a slide block 48 disposed in the slot of a feed regulator 44. The other end of the pitman 46 is also connected to a horizontal link 50 which, in turn, is pivotally connected to the feed bar 36 as shown. Thus, for a given inclination of the feed regulator 44, a predictable horizontal motion of the slide block 48 will result which is transferred to the feed dog 34 by a horizontal link member 50 and the feed bar 36. The inclination of the feed regulator 44 may be adjusted by rotation of the regulator shaft 52 which is fixed to the feed regulator. The regulator shaft 52 has a rock arm 54 affixed thereto at one end, with the rock arm 54 having a rod 56 also connected thereto which in turn is connected to a second reversible linear motor 58. Therefore, the linear motor 58 will be utilized to determine the feed rate of the sewing machine by determining the inclination of the feed regulator 44.

Figure 2:
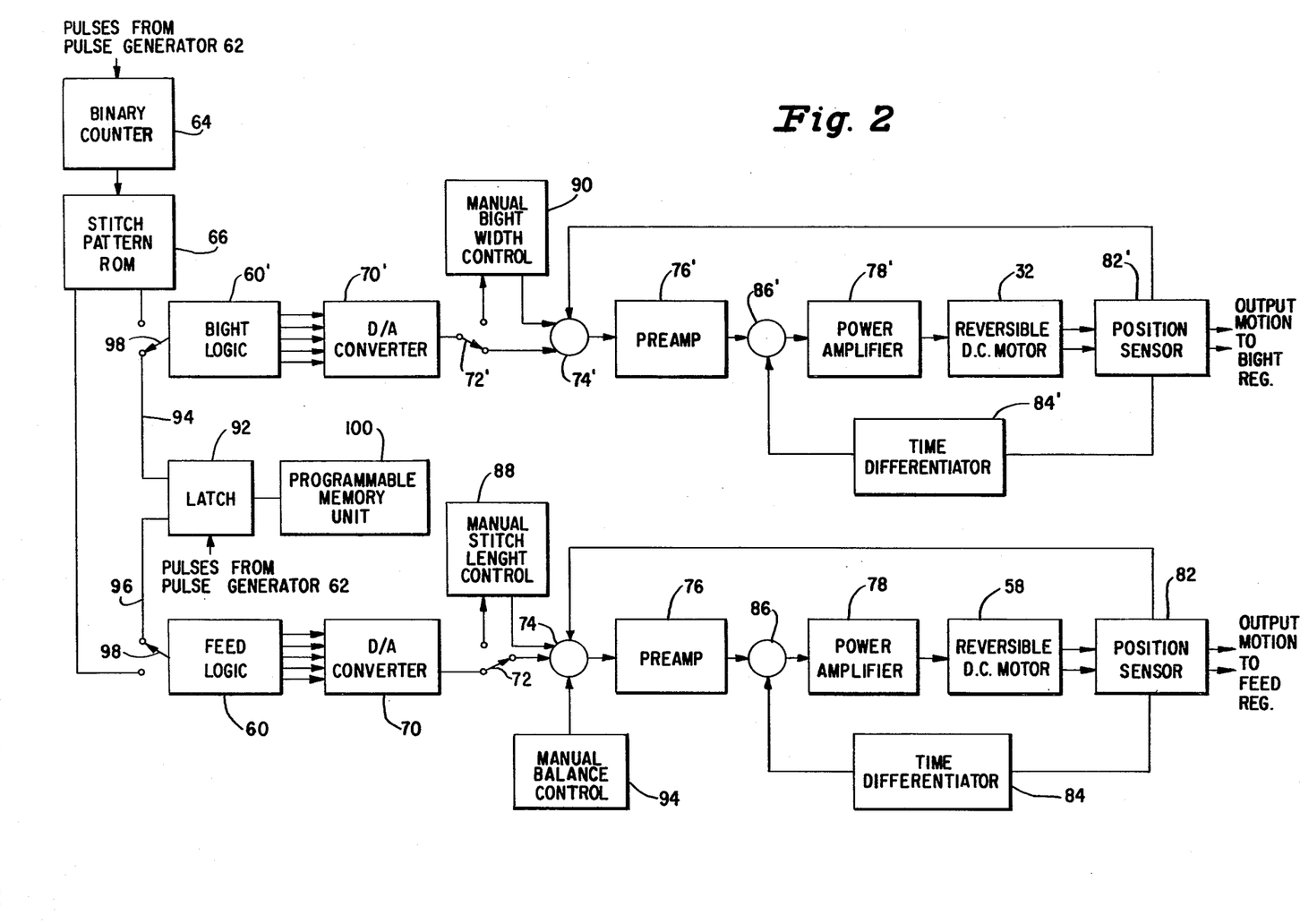
FIG. 2 is a general schematic block diagram of the electronic stitch pattern controlled sewing machine shown in FIG. 1 with a programmable memory unit connected thereto.

Referring now to FIG. 2, the general schematic block diagram is shown therein for the bight or the bight and feed control of the sewing machine. The portions of the block diagram for bight and feed control are substantially similar and it will suffice to describe the feed control only with similar numerals used for similar elements in the bight circuit except with the prime thereafter. The pattern information used for generating signals to drive the linear motors 32 and 58 preferably originates in a MOSFET large scale integration (LSI) integrated circuit which may include a ROM, the bight logic and feed logic portion of the electronic circuitry. A pulse generator 62 is supported on the main shaft 26 (see FIG. 1) and is operative to generate pulses which are counted up in a binary counter 64 and presented an address inputs to the stitch pattern ROM 66 which is then coded to produce as outputs therefrom five bits of bight information and five bits of feed information, respectively, as input to the bight logic 60' and feed logic 60. The feed information is processed in the logic block 60 which may include a latch whereby the feed information may be held for later release to the feed servo system at a time appropriate to the operation of the feed mechanism. Similarly, the bight information is processed in logic block 60', which may include a latch whereby the bight information may be held for a later release to the bight servo system at a time appropriate to the operation of the needle jogging mechanism. As mentioned above, since the servo systems for the bight and for the feed are identical except for the specific switching arrangement necessary for manual over-ride and balance control in the feed regulating system, the following description will for convenience be confined to the feed system only.

The information processed by the feed logic block 60 is presented to the digital to analog converter 70. The D/A converter 70 has an output which is a DC analog voltage representing a required feed position input. This line connects, in the automatic mode position of a switch 72, to a summing point 74 of a low level preamplifier 76 forming the first stage of a servo amplifier system. The switch 72 may be implemented by an FET device. The preamplifier 76 drives a power amplifier 78 which supplies direct current of reversible plurality to the electromechanical actuator or linear motor 58, which in its broadest sense comprises a reversible motor, to position the actuator 58 in accordance with the input analog voltage from the converter 70. A feed back position sensor 82, implemented by a potentiometer mechanically connected to the actuator 58, provides a feed back position signal indicative of the existing output condition. The input analog voltage and a feed back signal are algebraically summed at the summing point 74 to supply an error signal. The feed back signal from the position sensor 82 is also differentiated with respect to time in a differentiator 84, and the resulting rate signal is present to the summing point 86 of the power amplifier 78 to modify the positional signal at that point. The position sensor 82 may be any device that generates an analog voltage proportional to position and may, in this embodiment, be a simple linear potentiometer connected to a stable reference voltage and functioning as a voltage divider. The differentiator 84 is preferably an operational amplifier connected to produce an output signal equal to the time rate of change of the input voltage, as is well known in this art.

While the actuators 32 and 58 may be a conventional low inertia rotary DC motor, it is preferably for the purpose of the present invention that they take the form of linear actuators in which a light weight coil moves linearly in a constant flux field and is directly coupled to the load to be positioned. This simplifies the driving mechanical linkage and minimizes the inertia of the system. A switch 72 shown in the automatic mode position in FIG. 2 may be operated from the automatic position to another position referred to as a manual position. In this position the analog position voltage from the converter 70 is connected to the manual stitch length control 88 and is there manually regulated before passing to the summing point 74. Reference may be had to the U.S. Pat. No. 4,016,821 of Apr. 12, 1977, assigned to the same assignee as the present invention, for a more complete description of the manual stitch length control system.

Referring now to the bight control system illustrated in FIG. 2, a switch 72' shown in the automatic mode position may be operated also in a manual position for connecting into the circuit a manual bight width control circuit 90. Both of the switches 72' and 72 may be implemented by FET devices. In charging the switch 72' to the manual position, a potentiometer, indicated as the manual bight width control 90, is inserted into the circuit and acts as a gain control for an operational amplifier for the analog bight voltage from the converter 70' to provide any desired fraction of this voltage at the summing point 74' and so provides convenient means for narrowing or altering the pattern.

As further shown in FIG. 2, output signals may be directed from a latch 92, which is set by each pulse received from the pulse generator 62, to provide an output on line 94 to the bight logic 60' and an output on line 96 to the feed logic 60. FET switches 98 may be used selectively to connect the bight logic 60' and feed logic 60 to the output of a static programmable memory unit at 100 or to the stitch pattern read only memory 66 of the sewing machine. Preferably the switch 98 is a gang switch comprising the individual switches 98 shown connected to the bight logic 60' and the feed logic 60 so that the switches will be simultaneously shifted from association with the ROM 66 to association with the programmable memory unit 100. The purpose of switching from the ROM 66 to the programmable memory unit 100 will be more clearly described hereinafter.

In FIG. 2 is also shown a manual balance control block 94 which, as described in the above reference U.S. Pat. No. 4,016,821, may be used to vary the reverse feed only. In the formation of a closed pattern unit, such as a buttonhole, the stitching formed in forward feed may be optimized and the manual balance control 94 may be manipulated so that the reverse stitches in the second leg of a buttonhole, for example, may have an identical appearance to the first leg of the buttonhole formed in forward feed. The manual balance control 94 is responsive to any characteristic peculiar of reverse stitching, such as a most significant bit in a high state, to enable an FET switch, thereby connecting a potentiometer to the summing point 74. Further particulars on this particular control may be had by reference to the above-noted patent.

As made evident above, the programmable memory unit 100 is compatable with the use of a ROM 66 in a sewing machine in which the stitch position coordinate pattern data is electrically extracted and manipulated. The combination and selective use of the two types of memory devices disclosed herein provides a convenient means whereby operator generated stitch patterns may be implemented while retaining in the machine the ability to select from a permanently stored memory those patterns which may be most frequently utilized. It is a purpose of the invention to provide a high density programming means incorporated in a programmable memory unit 100 by which an operator may input into a solid state memory all those discrete points attainable by an electronically controlled sewing machine in a relatively compact area. For accomplishing this purpose, a programmable memory unit 100 is provided for coupling to the sewing machine through an electrical wire 102 (see FIG. 1) having a plug (not shown) for connection to the sewing machine. Automatic actuation of the switches 98 and disengagement of the ROM 66 may be provided for or in connection of the programmable memory unit 100 to the sewing machine.

Figure 3:
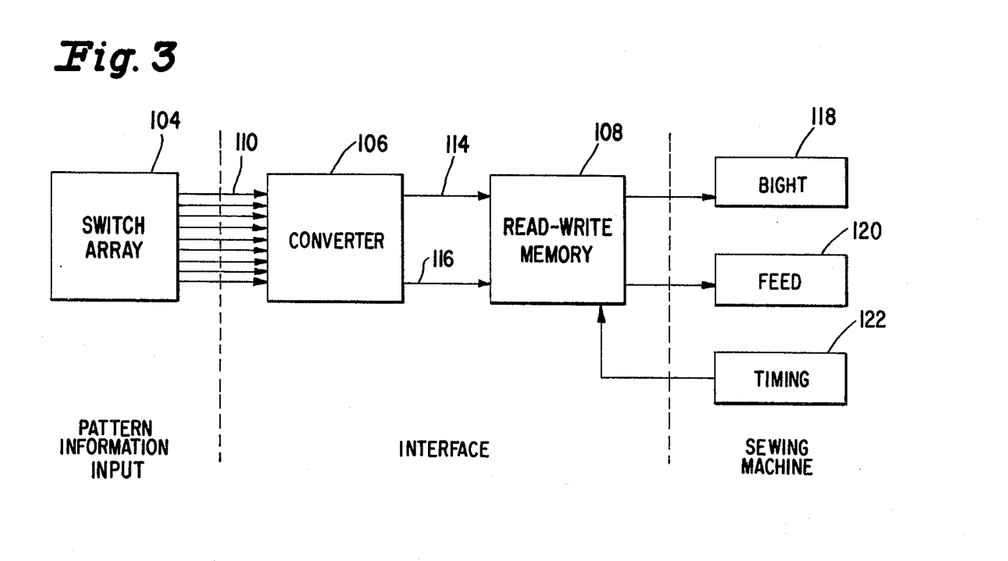
FIG. 3 is a schematic block diagram showing the components of the programmable memory device illustrated in FIGS. 1 and 2 and their connection to a sewing machine actuator or control mechanism.

The programmable memory unit 100, shown diagrammatically in FIG. 1, may include a switch array 104, a converter 106 and read-write memory 108, all as shown in the block diagram of FIG. 3. The switch array 104 refers to a plurality of switch points arranged in rows and columns in which the rows are relevant to the discreet stitch points attainable in an electronically controlled sewing machine and the columns referred to feed increments in forward and reverse in relation to a previously selected switch. Each switch of the switch array 104 will be related to a specific needle position and to a feed rate, forward or reverse, depending on the just prior stitch point. The connection to the switch array 104 may be made by lines 110, to converter 106, which converter is of the type which will convert signals from the switch array 104 into digital form suitable as input data for the read-write memory 108. The digital information from the converter 106 is passed to the read-write memory 108 by way of lines 114, 116. When a complete stitch pattern program has been entered into the read-write memory 108, timing pulses from the timing block 122, implemented by the pulse generator 62, may implement sequential release of the stitch pattern information from the read-write memory to the bight block 118 and feed block 120 as was described above and as is shown in FIG. 2 in more detail.

Figure 4:
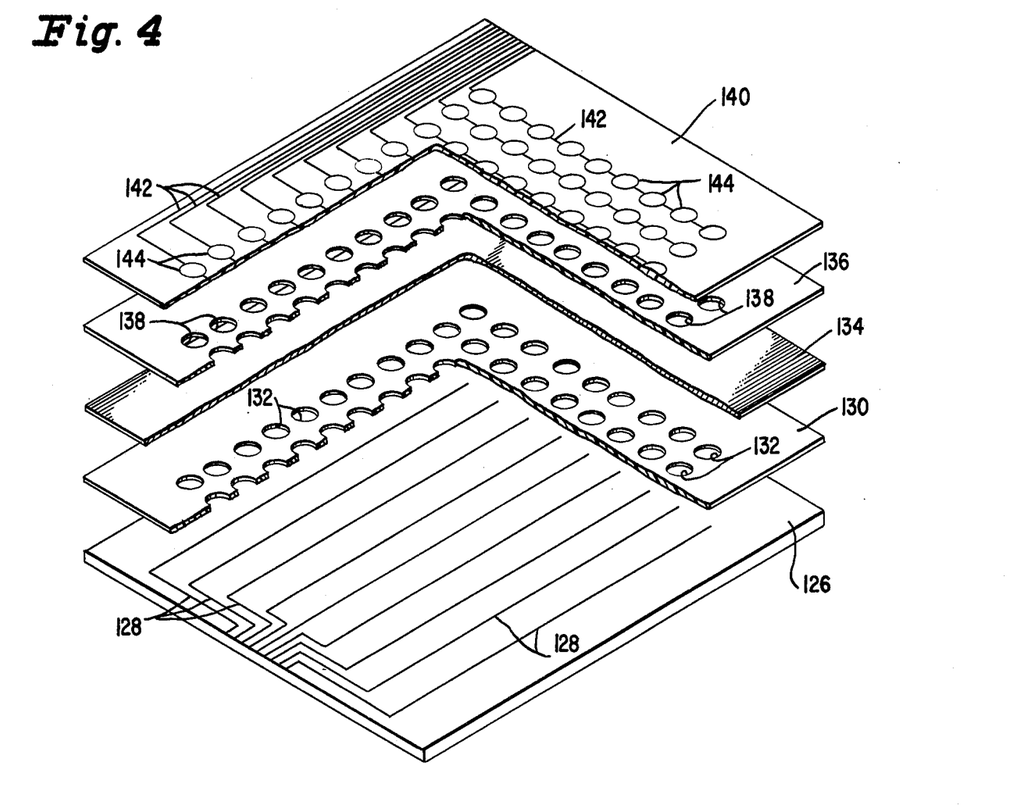
FIG. 4 is an exploded perspective view of an operator manipulating means shown attached to the sewing machine in FIG. 1.
Figure 5:
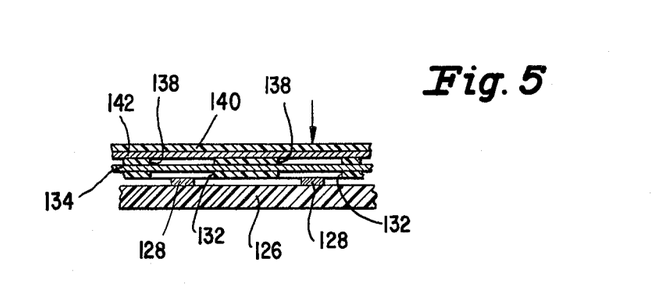
FIG. 5 is a cross-sectional view of a portion of the assembled operator manipulating means of FIG. 4.

Referring now to FIGS. 4 and 5, there is shown a first embodiment of a compact high density switch array for receiving an input indication from a sewing machine operator. As shown in FIG. 4, the switch array is built up of five layers, the lowest layer of which is a preferably rigid printed circuit sheet 126. Several conductive strips 128 in equally spaced parallel columns are supported on the insulating substrate of the printed circuit sheet 126, the ends of the conductive strips leading to an edge of the printed circuit sheet for connection thereto in the manner usual to printed circuits. The conductive strips 128 of the printed circuit sheet 126 face upwardly and are contiguous a flexible insulating sheet 130 fashioned preferably from a plastic material. The flexible insulating sheet 130 is formed with a plurality of circular apertures 132 arranged equidistant from each other in rows and columns such that each column of apertures overlies a conductive strip 128 of the printed circuit sheet 126. Overlying the flexible insulating sheet 130 is a thin sheet of conductive material 134 which may be implemented, for example, by a sheet of beryllium copper of two mil thickness. A second flexible insulating sheet 136 is arranged over the flexible conductive sheet 134, the second flexible insulating sheet having circular apertures 138 identical to and in registry with the circular apertures 132 of the flexible insulating sheet 130. Contiguous and overlying the second flexible insulating sheet 136 is a flexible printed circuit sheet 140 having rows of parallel, equally spaced conductive strips 142, on that side of the printed circuit sheet in contact with the second flexible insulating sheet 136. To indicate how the conductive strips 142 are arranged relative to the conductive strips 128, FIG. 4, and FIG. 6 in the second embodiment, are drawn with the lines 142 (163) shown on the outer side of the printed circuit sheet 140. It will be understood, however, that the conductors 142 (or 163) are contiguous the flexible insulating sheet 136 (or 157). The conductive strips 142 on the flexible printed circuit sheet 140 are aligned each with a row of apertures 138 of the second flexible insulating sheet 136 and extend normal to the columns of conductive strips 128 of the printed circuit sheet 126. The ends of the conductive strips 142 on the flexible printed circuit 140 are also brought to an edge for connection purposes as is usual in the printed circuit art. The flexible substrate of the flexible printed circuit sheet 140 may be formed on the side opposite the conductive strips 142 with circular markings 144 of the same size as the circular aperture 132, 138 and in alignment therewith to provide target areas for operator imposition of pressure for a purpose to be more clearly described below.

Referring to FIG. 5 there is shown a cross section of the layered sheets described in the preceding paragraph, as they would appear when assembled. Certain parts of this cross section such as the conductive strips 128, 142, have been enlarged in order that operation of the device may be more readily apparent. The cross section is taken along a conductive strip 142 of the flexible printed circuit sheet 140, the conductive strip being one of a row of conductive strips. The arrangement of the columns of conductive strips 128 normal to the row of conductive strips 142 is apparent in FIG. 5. The alignment of the apertures 132, 138 of the flexible insulating sheets 130, 140, respectively, is also apparent in FIG. 5. It is evident that pressure at the point indicated by the arrow in FIG. 5, as by a stylus of a sewing machine operator, will cause local deflection of the flexible printed circuit sheet 140 through the aperture 138 of the flexible insulating sheet 136, causing the conductive strip 142 to contact the flexible conductive sheet 134. The flexible conductive sheet 134 will also deflect through the aperture 132 of the flexible insulating sheet 130 to contact the conductive strip 128 on the printed circuit sheet 126. The contact point is localized by the apertures 132, 138 and adjacent rows and columns of conductive strips 128, 142, respectively, are prevented from making contact thereby. The specific row and column of conductive strips 142, 128, respectively, thus joined is indicative of a specific stitch point of the sewing machine requiring a specific position of the sewing needle and a specific feed adjustment which may be related in direction and magnitude to the just prior stitch point. When the force indicated by the arrow in FIG. 5 is removed, the resilience of the flexible printed circuit sheet 140 and the flexible conductive sheet 134 cause the contact between the conductive strips 128, 142 and the conductive sheet to be interrupted, and the next succeeding stitch point may be selected. The density of stitch points is limited primarily by the capability of a sewing machine operator to visually differentiate one stitch point from another. A higher compaction is achieved with smaller apertures 132, 138 and thinner flexible sheets 130, 134, 136, 140. Adjustments may be necessary to the thickness of the flexible printed circuit sheet 140 in order to permit depression through a smaller aperture, limited only by permanent deformation thereof or cracking of the conductive strips 142.

The conductive strips 128, 142 may each have a potential applied through a resistive element. The flexible conductive sheet 134 may be grounded. The particular column conductive strip 128 and row conductive strip 142 which are connected through the flexible conductive sheet 134 may be determined by scanning the resistive elements to ascertain in which pair of resistive elements there has been a voltage drop. By suitable circuitry this determination may be effective to generate a discrete voltage which may be converted by the converter 106 into digital information suitable for insertion into the read-write memory 108 as bight and feed data.

Figure 6:
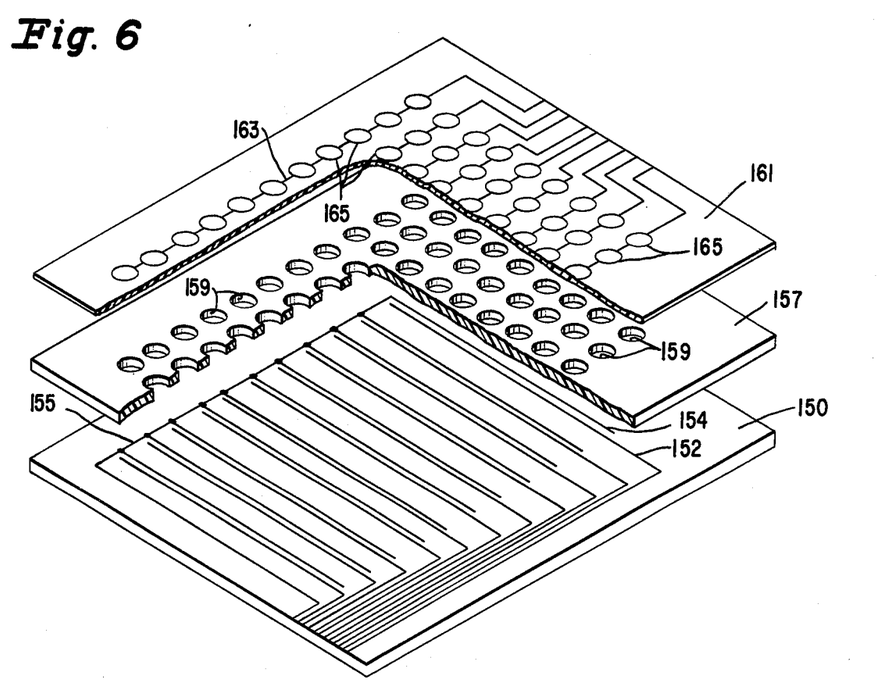
FIG. 6 is an exploded perspective view of a second embodiment of operator manipulating means; and, FIG. 7 is a cross-sectional view of a portion of the operator manipulating means of FIG. 6 when assembled.
Figure 7:
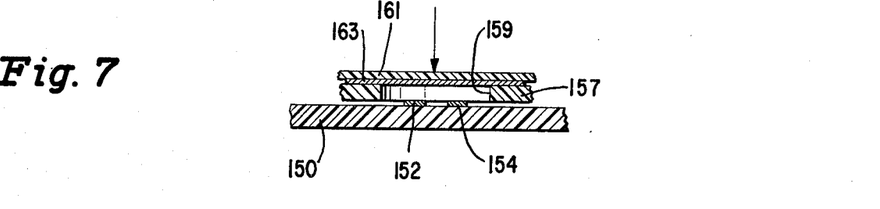

In the second embodiment, shown in FIGS. 6 and 7, a printed circuit sheet 150 forms the bottom layer and is preferably manufactured of a rigid material. The printed circuit sheet 150 is fashioned as before with conductive strips 152 extending parallel to each other and equally spaced one from the other with the ends thereof brought to an edge for connection thereto in the manner usual in printed circuit devices. Additionally the printed circuit sheet 150 is fashioned with second conductive strips 154, each separated from the first conductive strip 152 by a small gap and each connected to a common lead 155 also extending to the edge of the printed circuit board for connection to external circuitry. A flexible insulating sheet 157 is arranged adjacent the printed circuit sheet 150 and contiguous the conductive strips 152, 154. The flexible insulating sheet 157 is formed with circular apertures 159 of equal dimension and arranged in rows and columns as in the prior embodiment. The conductive strips 152, 154 of the printed circuit sheet 150 are, each pair, centered in a row of the apertures 159. A flexible printed circuit sheet 161 is arranged adjacent and overlying the flexible insulating sheet 157, and is formed with conductive strips 163 in columns centered on columns of apertures and contiguous the flexible insulating sheet 157. The conductive strips 163 are brought to the edge of the flexible printed circuit sheet 161 for connection to external circuitry. The flexible substrate of the flexible printed sheet 161 is formed with a plurality of circular markings 165 on the side opposite the conductive strips 163, which markings are of the same circular dimensions as the apertures 159 and aligned therewith so as to form a target for a sewing machine operator. Referring to FIG. 7 it may be seen that when pressure is applied as indicated by the arrow, the flexible printed circuit sheet 161 will deflect and bring the conductive strip 163 into contact with both the first conductive strip 152 and the second conductive strip 154 of the rigid printed circuit sheet 150. Thereby a connection between a column conductive strip 163, a row conductive strip 152 and a common conductive strip 154 is established as in the first embodiment permitting a determination as indicated previously of the specific stitch point desired. In the second embodiment, however, a flexible insulating sheet and a flexible conducting sheet has been eliminated without a sacrifice in operating capability. In the second embodiment, the advantages pertaining to high density switch array recited for the first embodiment have also been retained.

Thus has been disclosed a switching array arrangement which is susceptible of economical mass production by well known techniques and capable of providing a high density of switching points. Such a high density switching arrangement is compatible with digitally controlled device such as an electronically controlled sewing machine and provides in compact form a means for a sewing machine operator to indicate each specific stitch position of which the sewing machine is capable, for a large number of feed cycles, in compact form. Each specific stitch point of which an electronically controlled sewing machine is capable may be indicated in a row of markings 165 on the flexible pivot circuit sheet 161, while the least feed increment may be indicated by adjacent apertures in a column. It should be noted that while only 9×11 switch array has been disclosed in the drawings, this was merely done to accommodate simplicity, facilitating an understanding of the device. It will be understood that by the techniques taught by the invention a very much larger switch array may be accommodated in a compact area.

In the embodiments disclosed, a common conductor (134, 155) was provided to enable the use of existing equipment to determine the selected discrete conductive path. However, it will be appreciated by those skilled in the art that a ground or common lead is not necessary to the utilization of applicants invention. There are many techniques well known to those skilled in the art, by which a discrete conductive path in a switch array may be detected for encoding into digital form indicative of stitch coordinate information. One such technique would be to scan a row of conductors while connected to a column conductor, in order to find a discrete conductive path. If a conductive path is not found, the next adjacent column conductor may be contacted, and the row conductors scan repeated, and so on, until a conductive path is located.

Having thus set forth the nature of the invention, what is claimed herein is:

1. In a sewing machine having stitch forming means operative to form successive stitches including mechanism for influencing the stitch position coordinates of said successive stitches in the formation of a pattern of stitches, logic means responsive to input data representative of stitch position coordinates for producing stitch position coordinate electrical signals, actuating means responsive to signals from said logic means for controlling the position of said stitch forming means in accordance with input data fed to said logic means, and programming means operably connected with said sewing machine, said programming means including static read-write memory means operative for storing digital input data corresponding to a stitch pattern selected by the operator and for transmitting electrical digital output signals to said logic means such that an operator may select a stitch pattern program for entry into the sewing machine for automatic reproduction of the stitch pattern by the sewing machine, said programming means further including operator manipulating means for inserting a stitch pattern selected by the operator into said memory means and encoder means for encoding positional information derived from said operator manipulating means to digital input data for said memory means, said operator manipulating means comprising: a flexible printed circuit sheet having first conductors spaced from and parallel to each other; a printed circuit board having second conductors spaced from and parallel to each other, said printed circuit board being arranged with respect to said flexible printed circuit sheet so that the conductors of one are substantially perpendicular and in facing relationship to the conductors of the other; and means for establishing discrete conductive paths between a selected conductor on said printed circuit sheet and a selected second conductor on said printed circuit board, said means including a first and a second insulating sheets between said printed circuit sheet and said printed circuit board, said insulating sheets each having an array of apertures in registry with each other and aligned with said first conductors of said flexible printed circuit sheet and said second conductors of said printed circuit board, and a flexible sheet of conductive material separating said first and second insulating sheets; whereby depression of said flexible printed circuit sheet through an aperture of said first insulating sheet adjacent thereto will establish a discrete conductive path between a first conductor on said printed circuit sheet and said flexible conducting sheet and will deflect said flexible conducting sheet through an aperture in said second insulating sheet adjacent said printed circuit board in spaced registry with said aperture in said first insulating sheet to establish a discrete conductive path between said flexible conducting sheet and a second conductor on said printed circuit board.

2. In a sewing machine as claimed in claim 1 wherein said printed circuit board further includes third conductors spaced from and parallel to each other, each third conductor being arranged parallel to and adjacent a second conductor, whereby depression of said flexible printed circuit sheet through apertures of said first and second insulating sheets will establish a discrete conductive path between a first conductor on said printed circuit sheet and said third conductor of said printed circuit board and between said second and third conductors of said printed circuit board.

3. In a sewing machine having stitch forming means operative to form successive stitches including mechanisms for influencing the stitch position coordinates of said successive stitches in the formation of a pattern of stitches, logic means responsive to input data representative of stitch position coordinates for producing stitch position coordinate electrical signals, actuating means responsive to signals from said logic means for controlling the position of said stitch forming means in accordance with input data fed to said logic means, and programming means operably connected with said sewing machine, said programming means including static read-write memory means operative for storing digital input data corresponding to a stitch pattern selected by the operator and for transmitting electrical digital output signals to said logic means such that an operator may select a stitch pattern program for entry into the sewing machine for automatic reproduction of the stitch pattern by the sewing machine, said programming means further including operator manipulating means for inserting a stitch pattern selected by the operator into said memory means and encoder means for encoding positional information derived from said operator manipulating means to digital input data for said memory means, said operator manipulating means comprising: a flexible printed circuit sheet having first conductors spaced from and parallel to each other; a printed circuit board having second conductors spaced from and parallel to each other, said printed circuit board being arranged with respect to said flexible printed circuit sheet so that the conductors of one are substantially perpendicular and in facing relationship to the conductors of the other, a selected one of said printed circuit sheet and said printed circuit board having third conductors thereon said third conductors extending one each immediately adjacent one each conductor of said selected one of said printed circuit sheet and said printed circuit board, said third conductors being connected together; and means for establishing discrete conductive paths between a selected conductor on said printed circuit sheet, a selected second conductor on said printed circuit board and an adjacent third conductor, said means including at least one insulating sheet between said printed circuit sheet and said printed circuit board, said insulating sheet having an array of apertures aligned with said first conductors of said flexible printed circuit sheet, said second conductors of said printed circuit board and said third conductors, whereby depression of said flexible printed circuit sheet through an aperture of said insulating sheet will establish a discrete conductive path between a first conductor on said printed circuit sheet and a third conductor, and between said third conductor and a second conductor on said printed circuit board.

* * * * *